(No Model.)
C. W. KUEHL.
RAKE.
No. 563,281. Patented July 7, 1896.
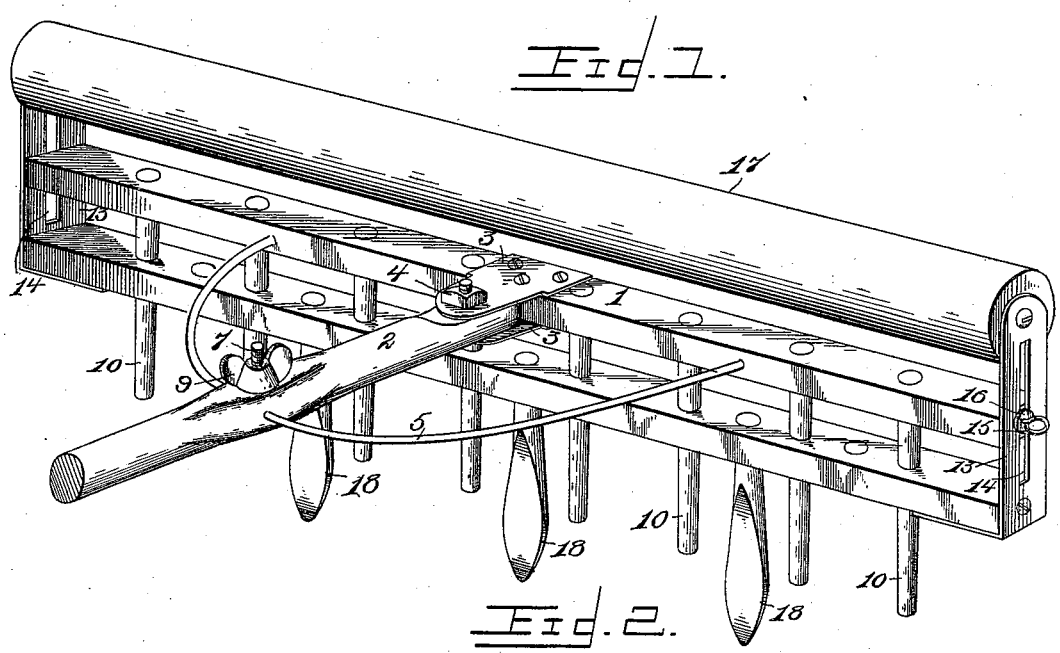
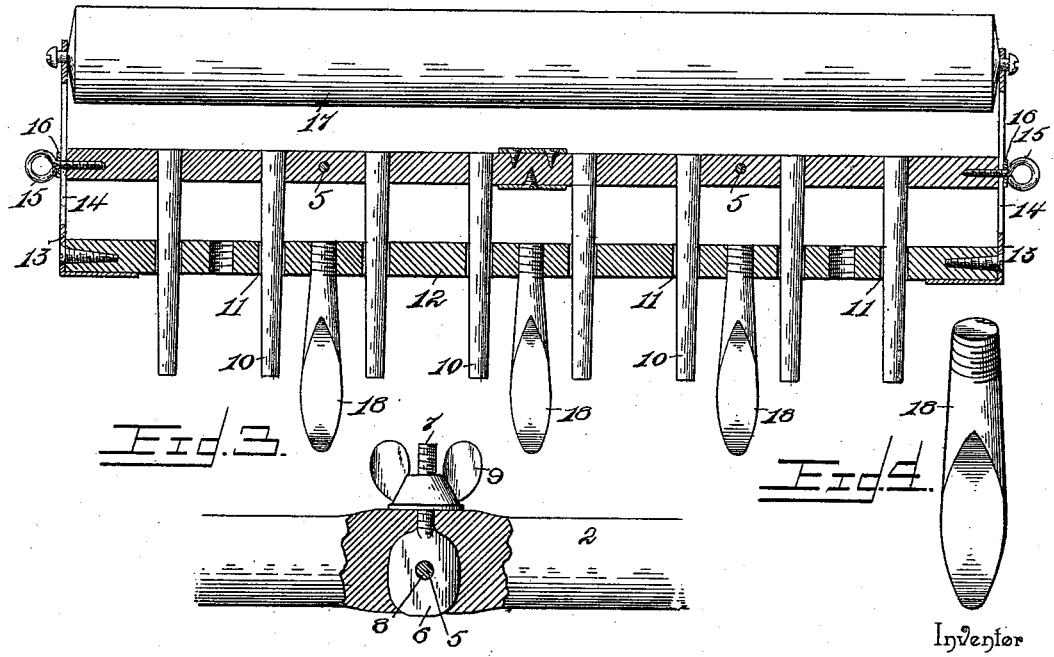
Witnesses,
W. J. LaVarre
Jno. W. Cromwell
By his Attorneys,
C. A. Snow & Co.
Inventor
Charles W. Kuehl

UNITED STATES PATENT OFFICE.

CHARLES W. KUEHL, OF MERRILL, WISCONSIN.

RAKE.

SPECIFICATION forming part of Letters Patent No. 563,281, dated July 7, 1896.

Application filed March 14, 1896. Serial No. 583,208. (No model.)

*To all whom it may concern:*

Be it known that I, CHARLES W. KUEHL, a citizen of the United States, residing at Merrill, in the county of Lincoln and State of Wisconsin, have invented a new and useful Rake, of which the following is a specification.

This invention relates to improvements in hand-rakes.

The object of the invention is to provide a device of the character mentioned in which the handle shall be so secured to the same as to permit of its adjustment at any angle with respect to the head of the rake, and also to provide adjusting means by which the rake shall be adapted either for use upon or beneath the surface of the ground.

The invention further contemplates providing means whereby the rows to be planted may be marked off, and by which the ground operated upon may be leveled.

To these ends the invention consists substantially in the construction, combination, and arrangement of parts, as will be hereinafter fully illustrated, described, and claimed.

In the accompanying drawings, Figure 1 is a perspective view of a rake constructed in accordance with the present invention. Fig. 2 is a longitudinal sectional view of the rakehead. Fig. 3 is a sectional view of the handle, showing the means for holding the same at any desired angle to the head. Fig. 4 is a detail perspective view of one of the marking-teeth.

Similar numerals of reference indicate corresponding parts throughout the figures.

Referring to the drawings, 1 designates a rake-bar, to which one end of a handle 2 is attached. For securing the handle to said rake-bar, plates 3 are used, the latter being mounted on opposite sides of the rake-bar, and between them, by means of a pivot pin or bolt 4, one end of the handle is attached. At points equidistant from the plates 3 the ends of a semicircular guide 5 enter the rake-bar, and this guide passes through the handle 2, as clearly illustrated. Within a slot in the handle 2 a metallic locking-plate 6 is disposed, the said plate having a threaded stem 7 and an aperture 8, the guide 5 passing through the latter. Upon the threaded stem 7 is mounted a thumb-nut 9, and when the same is screwed upon the stem 7 it bears against the handle 2 and binds the plate 6 upon the guide 5, thus holding the handle in any desired position with respect to the rake-bar.

10 designates the usual teeth of the rake-bar 1, such teeth passing through apertures 11 in a marker-bar 12. This marker-bar 12 is disposed beneath the rake-bar and has secured at its ends supporting-arms 13, each of which is provided with an elongated slot 14. Passing through the slots 14, and entering the ends of the rake-bar, are adjusting-screws 15, each of which has a washer 16, bearing against the outer side of the arms 13. The object of these screws is to hold the rake-bar at any desired distance from the marker-bar 12, thereby regulating the length of the teeth 10 for action upon the ground being worked. In the free ends of the supporting-arms 13 a roller 17 is journaled, the purpose of which is to pass over the ground after it has been raked, in order to level the same and break up any clods of earth therein.

The marker-bar 12 is provided with marking-teeth 18, having screw-threaded ends, which enter threaded apertures in the marker-bar. Each of these teeth is flattened at one side and is adapted to mark a row in the ground for planting purposes. While only three are shown in the drawings, it will be obvious that as many as desired may be used.

For raking purposes, the adjusting-screws 15 are loosened, and the rake-bar forced upon the marker-bar 12, thereby permitting the entire length of the teeth 10 to extend below the marker-bar. If the marking-teeth 18 are in position upon the marker-bar, they are removed therefrom, the adjusting-screws tightened, and the device is ready for use. Should it be required for marking, the adjusting-screws are loosened and the rake-bar elevated toward the roller 17. The marking-teeth are secured in the marker-bar, when the implement may be used for laying off rows in which seeds, plants, &c., may be placed. To operate the roller, it is simply necessary to reverse the rake, the former bearing upon the ground, and when pressure is applied any clods of earth will at once be broken and the surface leveled.

From the preceding description, it will be observed that I have produced a very desirable article. By reason of the pivotal connection between the handle and rake-bar, the former may be adjusted at any angle to the latter, thus enabling the operator to work a comparatively wide piece of ground without moving from the original position. Another advantageous feature will be found in the combination in a single implement of a rake and marker, the construction being such that either may be brought into use in a very short space of time.

Having thus described my invention, what I claim is—

1. The combination of a marker-bar carrying marking-teeth, supporting-arms attached at one end to opposite ends of the marker-bar, a leveling-roller journaled between the other ends of said arms, and a rake-bar adjustably mounted between said roller and the marker-bar, substantially as set forth.

2. The combination of a rake-bar having a handle secured thereto, a marker-bar disposed below the rake-bar and having apertures through which the teeth of the rake-bar pass, supporting-arms attached to the marker-bar and provided with slots, and adjusting-screws passing through the slots and engaging the ends of the rake-bar, substantially as set forth.

3. The combination of a rake-bar having a handle secured thereto, a marker-bar disposed below the rake-bar and provided with removable marking-teeth and apertures through which the teeth of the rake-bar pass, supporting-arms attached to the marker-bar and having slots, and adjusting-screws passing through the slots and engaging the ends of the rake-bar, substantially as set forth.

4. The combination of a rake-bar having rake-teeth, a marker-bar disposed below the rake-bar and provided with a series of apertures receiving the rake-teeth, a handle attached to the rake-bar, supporting-arms attached to the ends of the marker-bar, a leveling-roller journaled between the ends of the supporting-arms, and means for holding the rake-bar at any desired position between the marker-bar and the leveling-roller, substantially as set forth.

In testimony that I claim the foregoing as my own I have hereto affixed my signature in the presence of two witnesses.

CHARLES W. KUEHL.

Witnesses:
 DAVID M. PHINNEY,
 MAGGIE PHINNEY.